United States Patent
Takenaka et al.

(10) Patent No.: US 8,499,865 B2
(45) Date of Patent: Aug. 6, 2013

(54) FRICTION DRIVE DEVICE AND OMNI-DIRECTIONAL VEHICLE USING THE SAME

(75) Inventors: Toru Takenaka, Saitama (JP); Makoto Hirano, Saitama (JP); Hideharu Izumi, Saitama (JP); Kazuya Kuwabara, Saitama (JP); Taiji Koyama, Saitama (JP); Shinichiro Kobashi, Saitama (JP); Hiroshi Gomi, Saitama (JP); Masao Sasaki, Saitama (JP); Kazushi Hamaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 13/319,586

(22) PCT Filed: Apr. 9, 2010

(86) PCT No.: PCT/JP2010/002600
§ 371 (c)(1),
(2), (4) Date: Nov. 9, 2011

(87) PCT Pub. No.: WO2010/131411
PCT Pub. Date: Nov. 18, 2010

(65) Prior Publication Data
US 2012/0061156 A1 Mar. 15, 2012

(30) Foreign Application Priority Data
May 11, 2009 (JP) .................................. 2009-114498

(51) Int. Cl.
*B60B 19/12* (2006.01)
*B60K 17/00* (2006.01)

(52) U.S. Cl.
USPC .............................................. 180/21; 180/7.1

(58) Field of Classification Search
CPC .. B60B 19/003; B60B 19/125; B60K 7/0007; B62K 1/00; B62K 3/007
USPC ..................... 180/7.1, 7.2, 10, 21; 301/5.23; 476/68; 280/205
See application file for complete search history.

(56) References Cited

U.S. PATENT DOCUMENTS

| 6,302,230 | B1  | 10/2001 | Kamen et al. |
| 7,409,891 | B2* | 8/2008  | Takemura ........................ 74/640 |
| 7,980,336 | B2* | 7/2011  | Takenaka et al. .............. 180/7.1 |
| 8,220,571 | B2* | 7/2012  | Gomi et al. ..................... 180/21 |
| 8,353,378 | B2* | 1/2013  | Gomi et al. ................... 180/218 |

(Continued)

FOREIGN PATENT DOCUMENTS

| JP | 4-201793 A    | 7/1992 |
| JP | 2003-502002 A | 1/2003 |

(Continued)

*Primary Examiner* — Joseph Rocca
(74) *Attorney, Agent, or Firm* — Carrier Blackman & Associates, P.C.; Joseph P. Carrier; William D. Blackman

(57) ABSTRACT

Heat generated by a drive source of a friction drive device such as an electric motor is allowed to efficiently dissipate to the atmosphere, and the friction drive device and an omni-directional vehicle using the same is designed in a highly compact manner. Left and right electric drive devices are placed on a central axial line of left and right rotatable drive members, and external teeth members serving as output members of the electric drive devices are directly connected to the respective rotatable drive members in a torque transmitting and heat transmitting relationship.

4 Claims, 4 Drawing Sheets

(56) References Cited

U.S. PATENT DOCUMENTS

| | | | |
|---|---|---|---|
| 8,356,681 B2 * | 1/2013 | Gomi et al. | 180/21 |
| 2007/0261516 A1 * | 11/2007 | Saito | 74/640 |
| 2010/0096905 A1 | 4/2010 | Takenaka et al. | |
| 2011/0067938 A1 * | 3/2011 | Gomi et al. | 180/21 |
| 2011/0067943 A1 * | 3/2011 | Waita et al. | 180/311 |
| 2011/0070997 A1 * | 3/2011 | Gomi et al. | 476/66 |
| 2012/0086262 A1 * | 4/2012 | Makino | 301/5.23 |
| 2012/0168235 A1 * | 7/2012 | Gomi et al. | 180/21 |
| 2012/0168236 A1 * | 7/2012 | Hamaya et al. | 180/21 |
| 2012/0172169 A1 * | 7/2012 | Gomi et al. | 475/197 |
| 2012/0175175 A1 * | 7/2012 | Gomi et al. | 180/21 |

FOREIGN PATENT DOCUMENTS

| | | |
|---|---|---|
| JP | 2005-162060 A | 6/2005 |
| JP | 2005-344777 A | 12/2005 |
| JP | 2007-022342 A | 2/2007 |
| WO | 2008/132779 A1 | 11/2008 |
| WO | 2008/139740 A1 | 11/2008 |

* cited by examiner

FRICTION DRIVE DEVICE AND OMNI-DIRECTIONAL VEHICLE USING THE SAME

TECHNICAL FIELD

The present invention relates to a friction drive device and an omni-directional vehicle using the same.

BACKGROUND OF THE INVENTION

A known propelling device for an omni-directional vehicle consists of a friction drive device comprising a wheel (main wheel) including an endless annular member and a plurality of free rollers supported on the annular member in a rotatable manner around the tangential axial line of each free roller so that the wheel may rotate both around a central axial line thereof and an annular cross sectional center line thereof, a pair of rotatable drive members provided on either side of the wheel so as to be rotatable around an axial line coaxial with the center of the wheel, a plurality of drive rollers each mounted on the corresponding rotatable drive member so as to be rotatable around an axial line in a skewed relationship to the rotational center line of the rotatable drive member so as to engage the outer circumferential surface of the wheel, and a pair of electric motors for actuating the rotatable drive members around the central axial line thereof. See Patent Document 1, for instance.

PRIOR ART DOCUMENT(S)

Patent Document(s)

Patent Document 1: WO2008/132779A1 (US20100096905A1)

BRIEF SUMMARY OF THE INVENTION

Task to be Accomplished by the Invention

In the friction drive device mentioned above, the electric motors are placed above the wheel remote from the rotatable drive members, and the output of the electric motors are transmitted to the rotatable drive members via a power transmission mechanism such as an endless belt drive mechanism. In such a structure, as the electric motors and the power transmission mechanism have to be covered by a housing for practical use, the heat generated from the electric motors and the power transmission mechanism may not be efficiently dissipated to the atmosphere.

Also, in the friction drive device mentioned above, a relatively large space is required for accommodating the electric motors and the power transmission mechanism, and this prevents the compact design of the friction device and the omni-directional vehicle.

A primary object of the present invention to enable the heat generated from the electric motors and other drive source of a friction drive device to be dissipated efficiently to the atmosphere, and allow the friction drive device and an omni-directional vehicle using the same to be compactly designed.

Solution for Achieving the Task

The present invention provides a friction drive device, comprising: a wheel rotatable both around a central axial line and around an annular cross sectional center line; a pair of rotatable drive members located on either side of the wheel each rotatable around an axial center thereof; a plurality of drive rollers mounted on an outer circumferential surface of each rotatable drive member so as to be rotatable around a central axial line in a skewed relationship to the central axial line of the corresponding rotatable drive member, and each provided with an outer circumferential surface engaging an outer circumferential surface of the wheel; and an electric drive device for rotatively actuating each rotatable drive member around the central axial line thereof; wherein an output member of the electric drive device is fixedly attached to the rotatable drive member.

In the friction drive device of the present invention, preferably, each rotatable drive member is provided with a frustoconical part having a tapered outer circumferential surface progressively increasing in outer diameter toward an outer end thereof, and the drive rollers are mounted on the outer circumferential surface of the rotatable drive member, the frustoconical part defining a hollow interior receiving the electric drive device.

In the friction drive device of the present invention, preferably, the electric drive device comprises an electric motor and a strain wave gearing device, and the strain wave gearing device comprises an annular output member, an input member coaxially disposed inside the output member, and a strain wave gearing mechanism interposed between the input member and the output member, the input member being fixedly connected to an output shaft of the electric motor, and the output member being fixedly connected to the corresponding rotatable drive member.

The present invention also provides an omni-directional vehicle, comprising a friction drive device as defined above, wherein a casing of the electric motor is attached to a frame of the vehicle, and the vehicle is configured to travel by the wheel.

Effect of the Invention

According to the friction drive device or the omni-directional vehicle of the present invention, because the output member of each electric drive device is attached to the corresponding rotatable drive member, the heat of the electric drive device is transmitted to the rotatable drive member essentially by conduction, and the rotatable drive member effectively functions as a heat sink. As the rotatable drive member is relatively large in size so as to match the size of the wheel, and is rotated by the electric drive device, the rotatable drive member can function as a highly favorable and effective heat sink.

Thus, the heat generated from the electric drive device is favorably removed to the atmosphere, and the need for a belt drive power transmission mechanism or the like is eliminated so that the friction drive device and the omni-directional vehicle using the same can be designed in a highly compact manner.

BRIEF DESCRIPTION OF THE DRAWINGS

Now the present invention is described in the following with reference to the appended drawings, in which.

DETAILED DESCRIPTION OF THE PREFERRED EMBODIMENTS

A friction drive device and an omni-directional vehicle using the same embodying the present invention are described in the following with reference to FIGS. 1 to 4.

Figure 1:
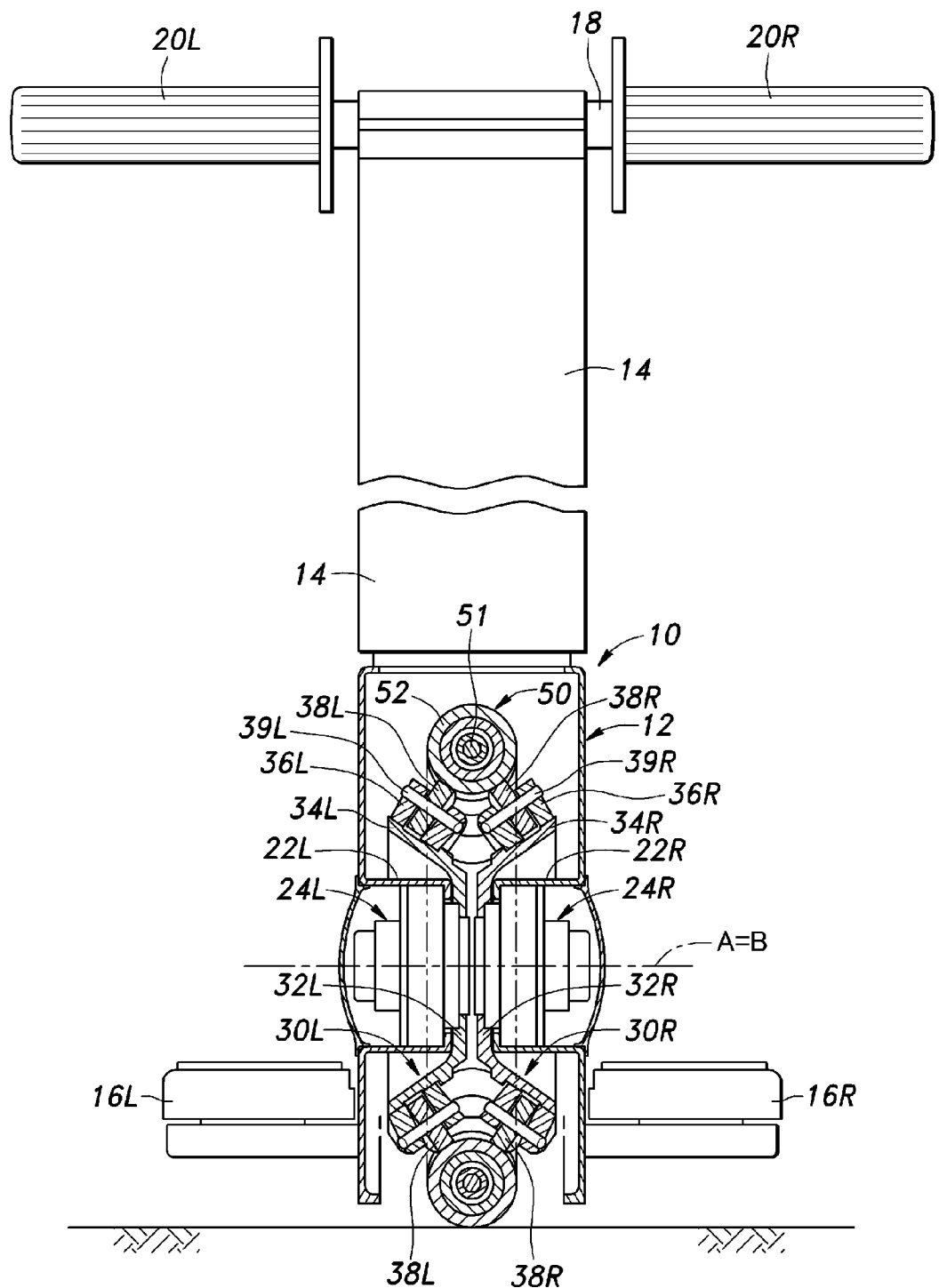
FIG. 1 is a front view of a friction drive device and an omni-directional vehicle using the same according to an embodiment of the present invention.

Referring to FIG. 1, the omni-directional vehicle 1 comprises a frame 10 including a lower frame 12 and a columnar upper frame 14 extending upward from the lower frame 12, a pair of steps 16L and 16R extending laterally outward from a lower part of the lower frame 12, a handle bar 18 extending horizontally in lateral directions from an upper end of the upper frame 14, and pair of grips 20L and 20R provided on either lateral terminal end of the handle bar 18. The upper frame 14 accommodates therein a battery power source, a control unit or the like.

The lower frame 12 is provided with a left side wall 12L and a right side wall 12R extending in parallel to each other in a laterally spaced apart relationship. The left side wall 12L and the right side wall 12R are provided with cylindrical portions 22L and 22R, respectively, projecting toward each other in a coaxial relationship. The cylindrical portions 22L and 22R are received in an inner space of frustoconical parts 34R and 34L of rotatable drive members 30L and 30R, respectively.

The left cylindrical portion 22L accommodates therein a left drive device 24L, and the right cylindrical portion 22R accommodates therein a right drive device 24R. The left drive device 24L and the right drive device 24R are symmetric to each other, and are each provided with an electric motor (electric drive device) 26L, 26R and a strain wave gearing device 28L, 28R. See FIG. 2. The left drive device 24L and the right drive device 24R will be described in greater detail hereinafter. Here, stationary members of the drive devices 24L and 24R are fixedly secured to the corresponding cylindrical portions 22L and 22R, and moveable members of the drive devices 24L and 24R are fixedly secured to the corresponding rotatable drive members 30L and 30R. Thus, the rotatable drive members 30L and 30R are rotatably supported by the lower frame 12 so as to be rotatable around a common central axial line A powered by the left and right drive devices 24L and 24R with a prescribed axial space (lateral space) defined therebetween.

Figure 3:
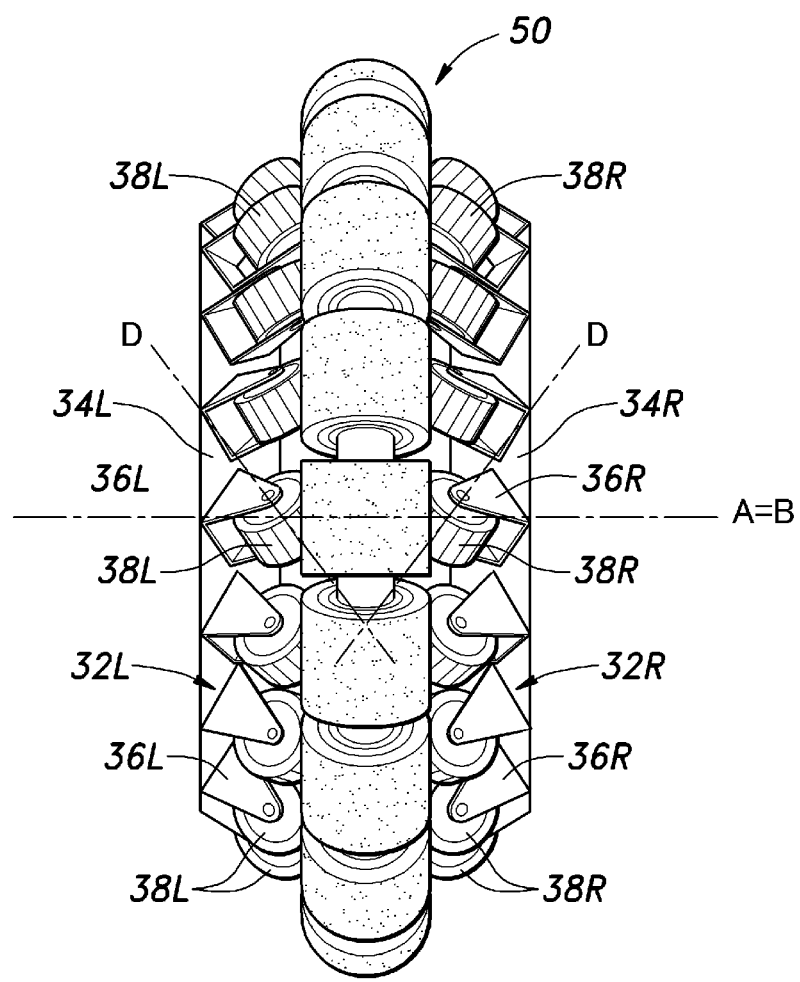
FIG. 3 is a front view of the friction drive device.

Each rotatable drive member 30L, 30R is provided with a hollow frustoconical part 34L, 34R with a large diameter end directed outward and is provided with a small diameter end wall 32L, 32R directed inward so as to oppose the small diameter end wall 32L, 32R of the other rotatable drive member 30L, 30R. As shown in FIG. 3, the tapered outer circumferential surface (circular circumferential surface) of the frustoconical part 34L, 34R of each rotatable drive member 30L, 30R rotatably supports roller shafts 39L, 39R of a plurality of drive rollers 39L, 39R via brackets 36L, 36R arranged circumferentially at a regular interval.

The left and right rotatable drive members 30L and 30R centrally support a wheel 50 by interposing the wheel 50 between the two sets of drive rollers 38L, 38R. In other words, the wheel 50 is supported by the left and right rotatable drive members 30L and 30R by being interposed between the two sets of drive rollers 38L, 38R so that the wheel 50 is enabled to rotate around a central axial line B coinciding with the central axial line A of the rotatable drive members 30L and 30R or around a rotational central line thereof.

Figure 4:
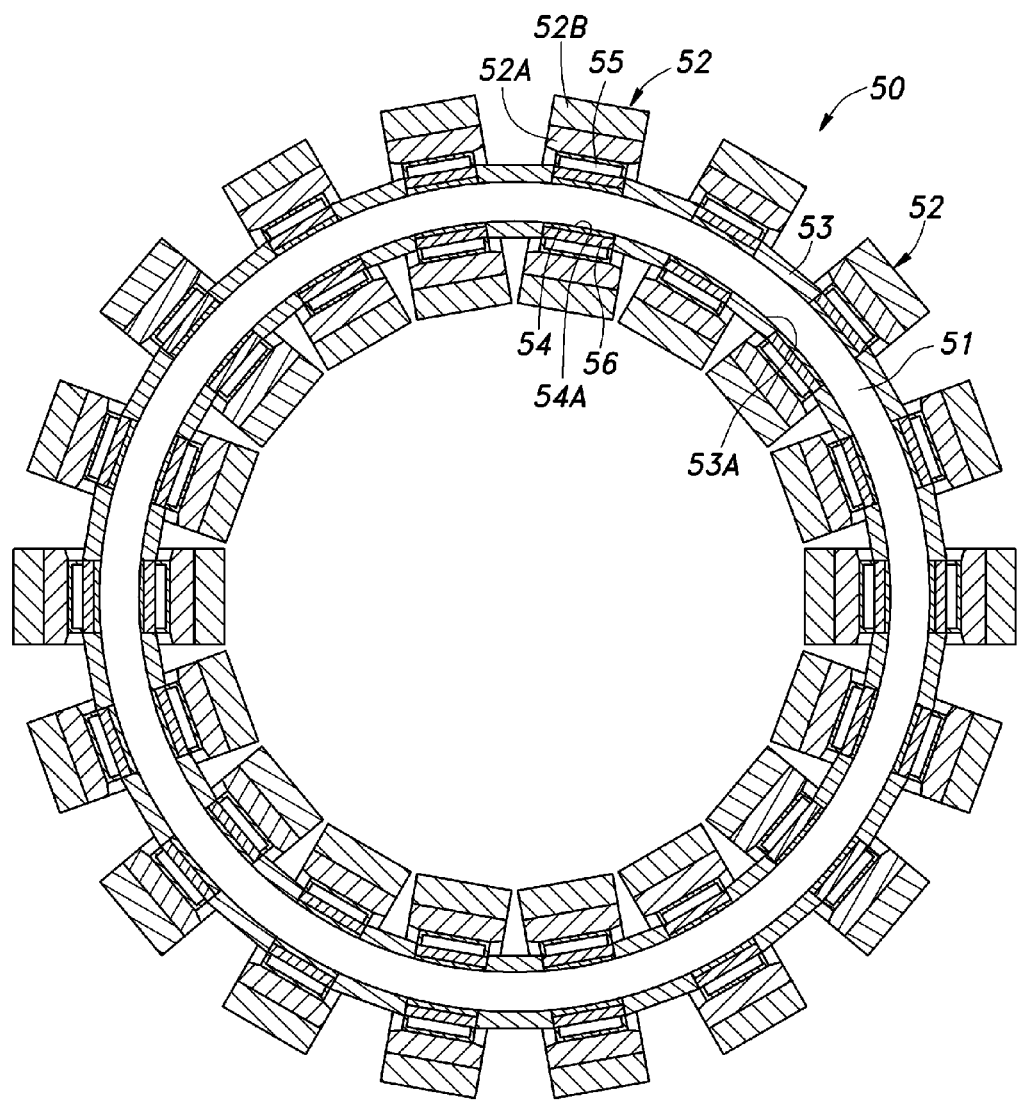
FIG. 4 is a sectional view of a wheel used in the friction drive device.

As shown in FIG. 4, the wheel 50 comprises an endless annular member 51 having an octagonal cross section (see FIG. 2), a plurality of free rollers 52 rotatably supported by the annular member 51 around the tangential axial line of the annular member 51 and spacers 53 each interposed between each adjacent pair of the free rollers 52.

The relationship between the annular member 51 and the free rollers 52 is described in the following. Each free roller 52 includes a metallic inner sleeve 54 having a mounting bore 54A curved by a same curvature as the annular member 51 and having an octagonal cross section so that the inner sleeve 54 is retained by the annular member 51 in a rotational fast manner. The inner race 56 of a needle bearing 55 is fitted on the outer circumferential surface of the inner sleeve 54.

The free rollers 52 are configured to engage the road surface, and each further comprises a cylindrical metallic sleeve 52A and an outer peripheral member 52B made of cylindrical elastomeric rubber material and defining an outer circumferential surface 52C. The metallic sleeve 52A of each free roller 52 serves as the outer race of the corresponding needle bearing 55 so that the metallic sleeves 52A are arranged on the annular member 51 like beads of a rosary each rotatable around the tangential axial line of the annular member 51. More specifically, each free roller 52 is rotatable around the tangential direction of the annular member 51 at the point where the free roller 52 is located or around the central axial line of the free roller 52. This rotation may be referred to as the rotation of the free rollers around the respective central axial lines thereof.

Each spacer 53 is also provided with a mounting bore 53A curved by a same curvature as the annular member 51 and having an octagonal cross section, and is fitted on the annular member 51 with the mounting bore 53A thereof in a rotationally fast manner. Each spacer 53 serves as a distance piece preventing the adjoining free rollers 52 from directly engaging each other.

The relationship between (the numbers of) the free rollers 52 and the left and right drive rollers 38L and 38R is determined such that the free roller 52 engaging the road surface is engaged by at least one of the left drive roller 38L and at least one of the right drive roller 38, and receives a propelling force (torque) from the left and right drive rollers 38L and 38R at all times. Therefore, the total slipping of the free rollers 52 is avoided.

The cross sectional center line of the wheel 50 of the illustrated embodiment is given by connecting the rotational center lines of the free rollers 25, and the rotation of the wheel 50 around the cross sectional center line is given by the rotation of each individual free roller 25.

The left drive rollers 38L and the right drive rollers 38R engage, at the respective outer circumferential surfaces thereof, the outer circumferential surfaces of the free rollers 52 which essentially define the outer circumferential surface of the wheel 50 so that the propelling force (torque) is frictionally transmitted from the rotatable drive members 30L and 30R to the free rollers 52. In other words, the outer circumferential surfaces of the left drive rollers 38L and the right drive rollers 38R frictionally engage the outer circumferential surfaces of the free rollers 52 in a torque transmitting relationship so as to impart the prescribed (rotational and translational) motion to the wheel 50.

As shown in FIG. 3, the left drive rollers 38L and the right drive rollers 38R are each disposed so as to be rotatable around a central axial line D extending neither perpendicular nor parallel to the rotational direction of the wheel 50 around the central axial line (center line) B (which is the same as the central axial line A of the rotatable drive members 30L and 30R) or, more specifically, with respect to the tangential direction of the circle centered around the central axial line B at the point of contact with the wheel 50. The left drive rollers 38L and the right drive rollers 38R are tilted with respect to the rotational direction of the wheel 50 around the central axial line B, and are thus each provided with a central axial line D which is in a skewed relationship to the rotational center line (central axial line A) of the rotatable drive members 30L and 30R.

In other words, the central axial line of each free roller 25 crosses the central axial lines of the left and right drive rollers 38L and 38R at the point of engagement, and the central axial lines of the left and right drive rollers 38L and 38R are tilted with respect to the central axial line of the free roller 25 on a projected plane in the direction of the central axial line A. The central axial lines of the left and right drive rollers 38L and 38R are tilted with the radial line of the annular member 51 corresponding to the central axial line of the corresponding free roller 25, and are also tilted with respect to an imaginary plane tangential to the central line of the annular member 51. This three dimensional tilting of the axial lines is similar to the tilting of the helical teeth of a conical gear.

For more detailed discussion of the skewed relationship of the axial lines, reference should be made to WO2008/139740A.

The wheel 50 is enabled to apply a lateral traction to the road surface owing to the rotation of the free rollers 52 and a fore and aft traction to the road surface owing to the rotation of the wheel 50 around the central axial line B thereof, engaged by the left and right drive rollers 38L and 38R that rotate with the rotatable drive members 30L and 30R.

In the omni-directional vehicle 1 of the illustrated embodiment, when the rotational directions and/or the rotational speeds of the rotatable drive members 30L and 30R caused by the electric motors 26R and 26L differ from each other, a component of force perpendicular to the circumferential (tangential) force applied by the rotatable drive members 30L and 30R acts on the contact surface of the main wheel 50 with the left and right drive rollers 38L and 38R. This component of force acts on the outer circumferential surface of each free roller 52 of the wheel 50 so as to twist the free roller 52 or, in other words, applies a rotational drive force to the free roller 52 centered around the cross sectional center line of the wheel 50 so that the free roller 52 are caused to rotate around the cross sectional center line (or the tangential axial line of the annular member 51).

The rotation of each free roller 52 around the cross sectional center line is created by the difference between the rotational speeds of the left and right rotatable drive members 30L and 30R. For instance, when the left and right rotatable drive members 30L and 30R are rotated at a same speed in opposite directions, the wheel 50 does not rotate around the central axial line B thereof, and rotates only around the cross sectional center line thereof. Thereby, the wheel 50 is propelled in the direction of the central axial line B of the wheel 50 or in the lateral direction, and the omni-directional vehicle 1 is caused to travel laterally.

When the left and right rotatable drive members 30L and 30R are rotated at a same speed and in a same direction, the free rollers 52 do not rotate around the cross sectional center line (tangential axial line of the annular member 51), and the wheel 50 rotate around the central axial line B so that the omni-directional vehicle 1 is caused to travel either in the forward or backward direction without turning.

Thus, the omni-directional vehicle 1 is enabled to travel in any desired direction on the road surface by individually controlling the rotational speeds and rotational directions of the left and right rotatable drive members 30L and 30R by means of the electric motors 26R and 26L.

Figure 2:
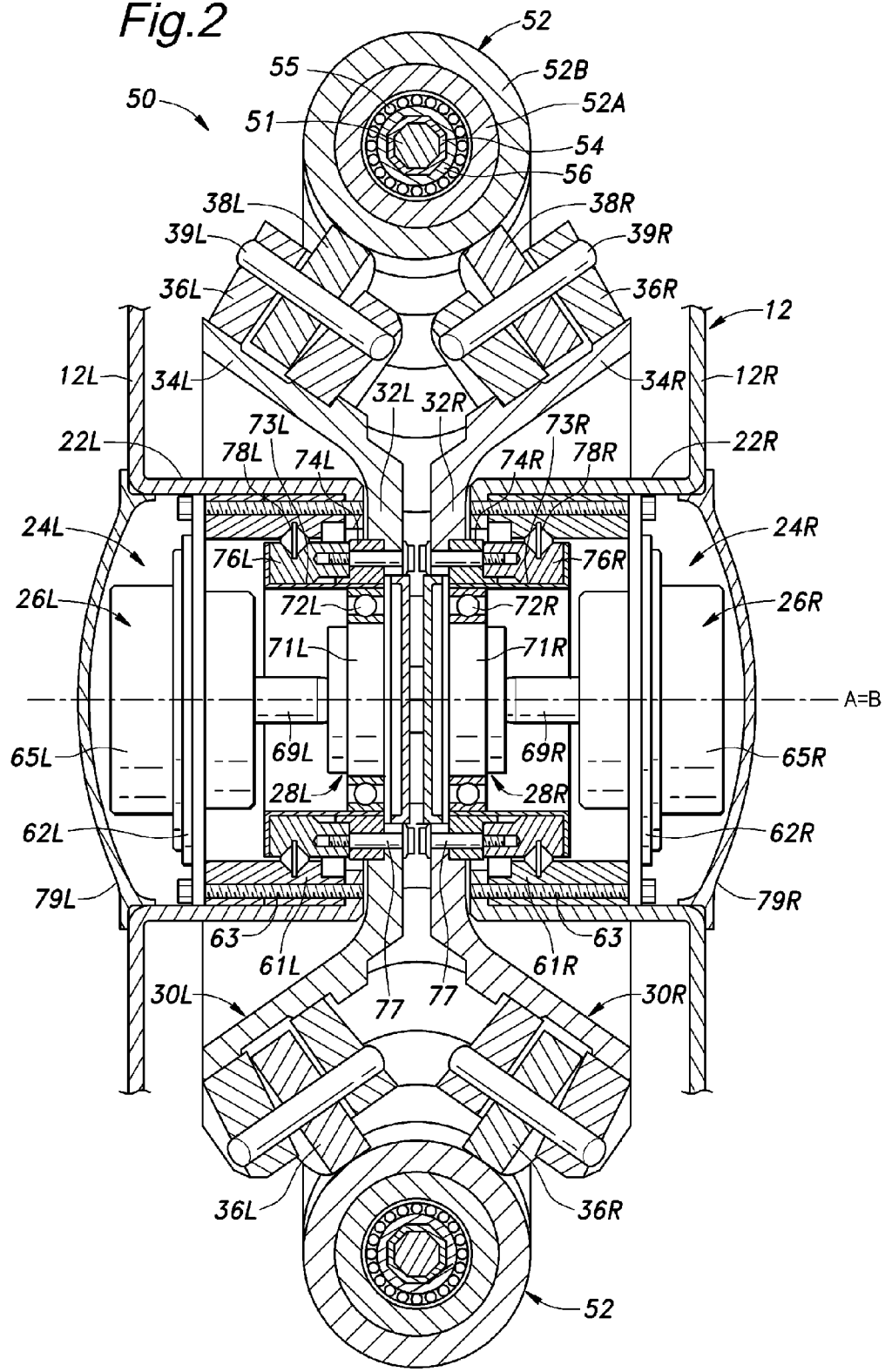
FIG. 2 is an enlarged sectional view of the friction drive device.

The details of the left drive device 24L and the right drive device 24R are described in the following with reference to FIG. 2. A cylindrical fixed housing 61L, 61R and a mounting member 62L, 62R are fixedly connected to each cylindrical portion 22L, 22R of the lower housing 12 by using threaded bolts 63 in a coaxial relationship to those secured to the other cylindrical portion 22L, 22R of the lower housing 12. To each mounting member 62L, 62R is fixedly attached the housing 65L, 65R of the corresponding electric motor 26R, 26L as a fixed end of the corresponding drive device 24L, 24R.

Each strain wave gearing (Harmonic Drive gear: Trademark) device 28L, 28R is provided with a per se known structure, and comprises a wave plug 71L, 71R having an elliptic profile and given with a high stiffness, a wave bearing 72L, 72R fitted on the outer circumferential surface of the corresponding wave plug 71L, 71R, a flexible external teeth member 73L, 73R consisting of a flanged cylindrical member with external teeth formed on the outer circumferential surface thereof and frictional engaging the outer circumferential surface of the corresponding wave bearing 72L, 72R and an internal teeth member 74L, 74R consisting of a highly stiff ring member having internal teeth meshing with the external teeth of the corresponding flexible external teeth member 73L, 73R.

Each wave plug 71L, 71R serving as an input member is fixedly connected to a rotor shaft (motor output shaft) 69L, 69R of the corresponding electric motor 26R, 26L. Each internal teeth member 74L, 74R serving as an output member is fixedly connected to the corresponding rotatable drive member 30L, 30R by using threaded bolts 77 in a coaxial relationship with the central axial line A thereof along with a support member 76L, 76R for the corresponding flexible external teeth member 73L, 73R. In this manner, the two strain wave gearing devices 28L and 28R are connected to the corresponding rotatable drive members 30L and 30R in a torque transmitting relationship. Thereby, a belt drive power transmission mechanism is not required, and the omni-directional vehicle 1 may be designed in a highly compact manner.

The support members 76L and 76R are rotatably supported by the cylindrical fixed housing 61L and 61R, respectively, via a bearing 78L, 78R.

In each strain wave gearing device 28L, 28R, a relative rotation is caused between the flexible external teeth member 73L, 73R and the internal teeth member 74L, 74R owing to the difference between the numbers of teeth of these two members, and the rotation of the rotor member 70L, 70R is transmitted to the rotatable drive member 30L, 30R at a significantly reduced rotational speed.

The two strain wave gearing devices 28L and 28R as well as the two electric motors 26L and 26R are substantially entirely received in the corresponding cylindrical portions 22L and 22R. Also, each cylindrical portion 22L, 22R is mostly received in the frustoconical part 34L, 34R of the corresponding rotatable drive member 30L, 30R. Thereby, each drive device 24L, 24R is received in the internal space of the corresponding frustoconical part 34L, 34R so that the internal space of each frustoconical part 34L, 34R can be efficiently utilized for accommodating the corresponding drive device 24L, 24R. This further contributes to the compact design of the omni-directional vehicle 1.

The open end of each cylindrical portion 22L, 22R is closed by a cap member 79L, 79R which is detachably attached to the corresponding wall 12L, 12R so as to keep off moisture and other foreign matters from the interior of the corresponding cylindrical portion 22L, 22R.

As each internal teeth member 74L, 74R serving as an output member of the strain wave gearing device 28L, 28R is fixedly secured directly to the corresponding rotatable drive member 30L, 30R by using the threaded bolts 77, the internal teeth member 74L, 74R is connected to the corresponding rotatable drive member 30L, 30R in a heat transmitting relationship. Thereby, the heat generated from the electric motor 26L, 26R and the strain wave gearing device 28L, 28R is transmitted to the corresponding drive member 30L, 30R by conduction, and the rotatable drive member 30L, 30R having a relatively large surface area functions as an effective heat sink.

As the rotatable drive members 30L and 30R having a relatively large size that matches with the size of the wheel 50 serve an effective heat sink for the left and right drive devices 24L and 24R, and, in addition, the rotatable drive members 30L and 30 are rotated by the left and right drive devices 24L and 24, the rotatable drive members 30L and 30R are cooled by air flow, in addition to heat radiation, so that the left and right drive devices 24L and 24R function as a highly efficient heat sink.

Thereby, the heat generated by the electric drive devices 24L and 24R is efficiently dissipated to the atmosphere so that the durability of the electric drive devices 24L and 24R is improved owing to the improved cooling efficiency.

The wheel 50 may not be necessarily concentric with the left and right rotatable drive members 30L and 30R, and may be offset upward or in the fore and aft direction with respect to the left and right rotatable drive members 30L and 30R.

GLOSSARY 1 omni-directional vehicle
12 lower frame
24L left drive device
24R right drive device
26R, 26L electric motor
28R, 28L strain wave gearing device
30R, 30L rotatable drive member
34R, 34L frustoconical part
38L left drive roller
38R right drive roller
50 wheel
51 annular member
52 free roller
65L, 65R rear housing
69L, 69R rotor shaft
71L, 71R wave plug
73L, 73R flexible external teeth member
74L, 74R internal teeth member

The invention claimed is:
1. A friction drive device, comprising:
a wheel rotatable both around a central axial line and around an annular cross sectional center line;
a pair of rotatable drive members located on either side of the wheel each rotatable around an axial center thereof;
a plurality of drive rollers mounted on an outer circumferential surface of each rotatable drive member so as to be rotatable around a central axial line in a skewed relationship to the central axial line of the corresponding rotatable drive member, and each provided with an outer circumferential surface engaging an outer circumferential surface of the wheel; and
a pair of electric drive devices each for rotatively actuating a corresponding one of the pair of rotatable drive members around a central axial line of the electric drive device;
wherein an output member of each said electric drive device is fixedly attached to the corresponding one of the rotatable drive members,
wherein each rotatable drive member is provided with a frustoconical part having a tapered outer circumferential surface progressively increasing in outer diameter toward an outer end thereof, and the drive rollers are mounted on the outer circumferential surface of the rotatable drive member, the frustoconical part defining a hollow interior receiving a corresponding one of the pair of electric drive devices.

2. The friction drive device according to claim 1, wherein each of the pair of electric drive devices comprises an electric motor and a strain wave gearing device, and the strain wave gearing device comprises an annular output member, an input member coaxially disposed inside the output member, and a strain wave gearing mechanism interposed between the input member and the output member, the input member being fixedly connected to an output shaft of the electric motor, and the output member being fixedly connected to the corresponding rotatable drive member.

3. An omni-directional vehicle, comprising a friction drive device according to claim 2, wherein a casing of each of the pair of electric drive devices is attached to a frame of the vehicle, and the vehicle is configured to travel by the wheel.

4. An omni-directional vehicle, comprising a friction drive device according to claim 1, wherein a casing of each of the pair of electric drive devices is attached to a frame of the vehicle, and the vehicle is configured to travel by the wheel.

* * * * *